United States Patent [19]

Davinson

[11] Patent Number: 4,596,460
[45] Date of Patent: Jun. 24, 1986

[54] OPTICAL DETERMINATION OF CLEARANCES

[75] Inventor: Ian Davinson, Derby, England

[73] Assignee: Rolls-Royce Limited, London, England

[21] Appl. No.: 572,451

[22] Filed: Jan. 20, 1984

[30] Foreign Application Priority Data

Mar. 18, 1983 [GB] United Kingdom ............... 8307534

[51] Int. Cl.$^4$ ............... G01C 3/10; G01J 1/20
[52] U.S. Cl. ...................... 356/1; 250/201
[58] Field of Search ................ 356/1,4; 250/201

[56] References Cited

U.S. PATENT DOCUMENTS

| | | | |
|---|---|---|---|
| 3,940,608 | 2/1976 | Kissinger et al. | |
| 4,326,804 | 4/1982 | Mossey. | |
| 4,391,513 | 7/1983 | Fujiki | 356/1 |
| 4,397,547 | 8/1983 | Grassl | 356/1 |
| 4,420,250 | 12/1983 | Kompa | 356/5 |

FOREIGN PATENT DOCUMENTS 0002428 6/1978 European Pat. Off.
2061495A 5/1981 United Kingdom.

Primary Examiner—S. C. Buczinski
Assistant Examiner—Linda J. Wallace
Attorney, Agent, or Firm—Cushman, Darby & Cushman

[57] ABSTRACT

Simplification in manufacture and use of an optical triangulation probe is achieved by providing it with a T-shaped optical path. The cross-bar of the T-shape extends between a light source comprising a laser diode and a light detector comprising a photodiode array, while the stem of the T-shape contains a rod-shaped lens and prism arrangement. The cross-bar of the T-shape is occupied by a solid optical bar-shaped assembly comprising a number of blocks cemented together and providing reflective surfaces for directing outgoing and return light through the T-shape. The lens and prism arrangement focusses outgoing light from laser diode onto the surface of an object whose distance is to be measured and focusses reflected return light onto the photodiode array as a light spot. Position of the light spot as monitored by the output signal of a photodiode array is a measure of distance D between the object and the probe. The probe is for use in gas turbines for measuring clearances between rotor blade tips and turbine casings.

8 Claims, 7 Drawing Figures

OPTICAL DETERMINATION OF CLEARANCES

The present invention relates to the determination of clearances between confronting surfaces by optical triangulation and particularly to such clearance determination between the radially outer tip surface of a rotor blade aerofoil and a surrounding stationary shroud surface in a gas turbine engine.

It is well known that significant improvements in gas turbine engine efficiency can be achieved by controlling the shroud/rotor blade tip clearance in the high pressure turbine stage of an engine so as to optimise the clearance at various engine conditions. Various ways are known of controlling the clearance, changes in which are caused by differential growth or shrinkage of rotor and shroud diameters due to thermal and centrifugal factors.

In order to control the clearance, it must first be measured accurately, and one known way of performing this function is to determine the position of the blade tips relative to the shroud surface by means of an optical probe employing a triangulation technique, hereinafter designated an optical triangulation probe.

Hitherto, in existing designs of optical triangulation probes incorporating optical and electro-optical components in a compact casing, difficulty in achieving accurate alignment and positioning of the cooperating components has necessitated building into the probes various interacting adjustments of individual components in order to compensate for machining tolerances, etc. Such probes have therefore been expensive to make and time consuming to adjust correctly for use when made.

According to the present invention, an optical triangulation probe, for obtaining a measure of the distance between a triangulation baseline and a confronting surface, comprises a light source for producing a light beam outgoing from the probe, light detector means, lens means for focussing said outgoing light beam onto the confronting surface to form a first spot of light thereon and for focussing light reflected from the confronting surface onto the light detector means to form a second spot of light thereon, the light detector means being adapted to produce an output signal which depends upon the position of said second spot of light thereon, and prism means configured to provide the triangulation baseline by intercepting the outgoing light beam after its passage through the lens means and deflecting it onto the confronting surface and by intercepting light reflected from the confronting surface and deflecting it onto the lens means, whereby the position of said second spot of light on the light detector means is dependent upon the distance between the prism means and the confronting surface;

wherein the optical path between the light source and the light detector means is T-shaped such that the stem of the T-shape includes the lens means and the prism means and the cross-bar of the T-shape extends between the light source and the light detector means, said cross-bar including means whereby the outgoing light beam from the light source is directed along said cross-bar and into said stem and the reflected light from said stem is directed along said cross-bar and onto the light detector means.

In the present specification, references to reflected light include light scattered back from a non-specular surface and references to a spot of light include such a spot when it comprises a line or bar-shape.

The T-shaped optical path simplifies the manufacture and use of optical triangulation probes, as described hereafter.

In a preferred embodiment the cross-bar of the T-shaped optical path includes a bar-shaped optical assembly comprising a plurality of components secured together, the components having reflective surfaces angled to direct light into or out of the cross-bar as required. Such a bar-shaped optical assembly is convenient for locating accurately with respect to the other components of the probe and is easily held within the cross-bar of the optical path.

In order to reduce stray interior light, the exterior surfaces of the bar-shaped optical assembly are provided with a light-absorptive finish except for areas on those exterior surfaces where light-transmission therethrough is required.

If desired, either or both the light source and the light detector means may be located offset from the cross-bar of the T-shaped optical path, means being provided to direct light from the light source into the cross-bar or from the cross-bar onto the light detector means as required. This enables flexibility in the design layout of the probe.

In another aspect of the invention the functions of the lens means and the prism means may be combined in a unitary optical component having distal and proximate optical surfaces with respect to the confronting surface, the distal optical surface comprising the lens means and the proximate optical surface comprising the prism means. Preferably, the unitary optical component comprises a cylindrical rod with its ends shaped as the distal and proximate optical surfaces.

The prism means comprises roof prism means.

An embodiment of the invention will now be described by way of example only, with reference to the accompanying drawings, in which:

FIG. 2b is a scrap view of Section A—A in FIG. 2a, and

The drawings are not to scale.

Figure 1:
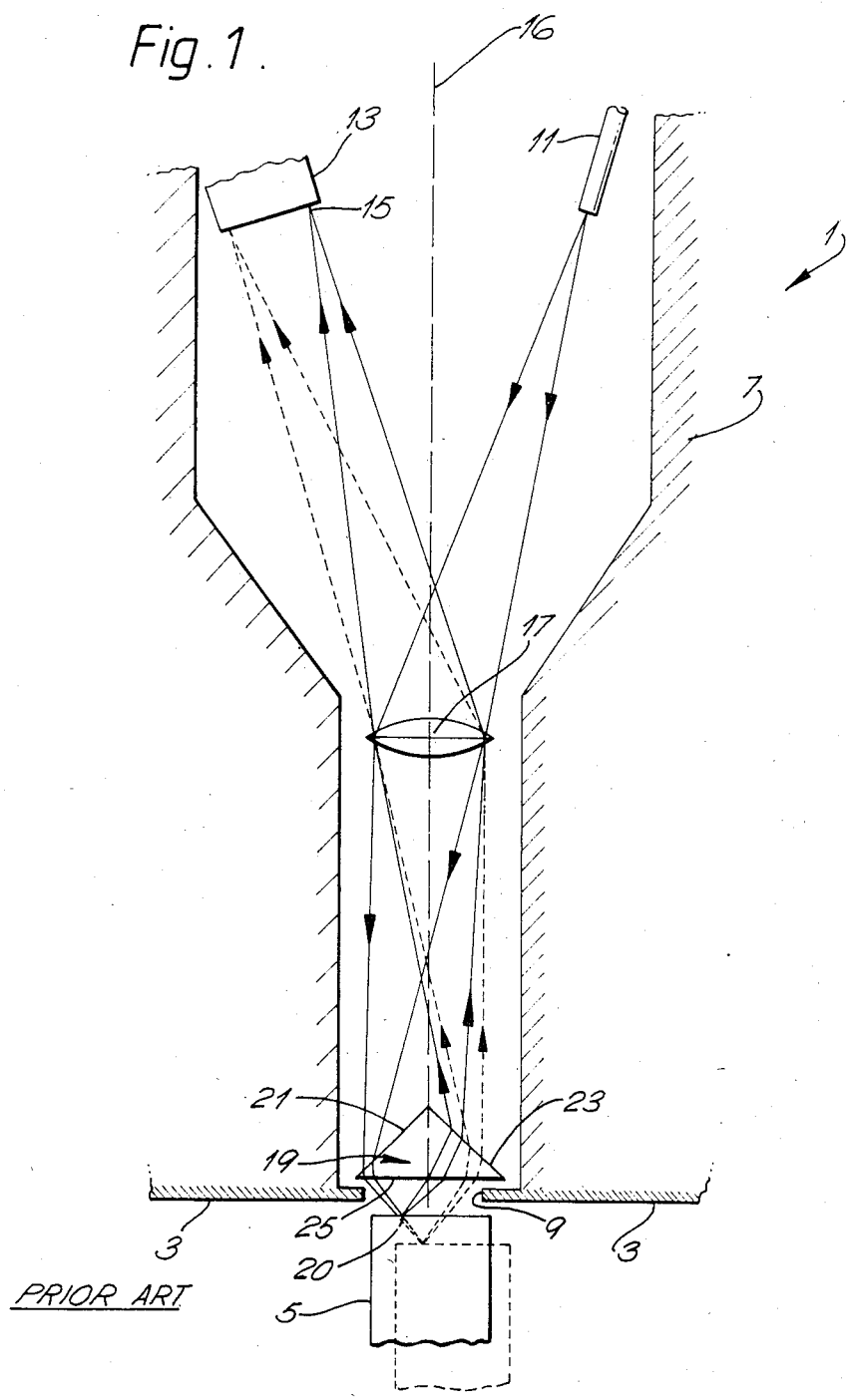
FIG. 1 is a diagram illustrating the general arrangement of an optical triangulation probe of known type.

Referring now to FIG. 1, the known type of optical triangulation probe 1 is shown measuring the clearance between stationary shroud surface 3 and the tip of a turbine rotor blade aerofoil 5. This clearance changes because the diameters of the rotor and the shroud do not change by the same amount or at the same rate as each other as their temperatures change. Rotor blade 5 is also subject to centrifugally induced stresses, which again cause the rotor diameter to change relative to the stationary shroud.

Blade 5 is shown at two positions, the first (in full lines) causing the minimum blade/shroud clearance, and the second (in dashed lines) causing the maximum clearance.

Probe 1 has a casing 7 which encloses the electro-optical and optical components and cooperates with a slot 9 in the shroud 3 through which the triangulation is performed. The electro-optical components include a small intense light source 11, such as a pulsed laser diode, and a sensitive photodiode array 13 with an electrical output which reveals the position of a spot of light 15 on its surface. Light source 11 and array 13 are offset to opposed (respectively right and left) sides of the centreline 16 of the optical components, which comprise a focussing lens 17 and a triangular or "roof" prism 19. Consequently, as shown by the unbroken arrowed lines, lens 17 images light source 11 as light spot 20 onto the blade 5 through the left hand side 21 of prism 19, whilst lens 17 also causes the array 13 to "see" the focussed image of light spot 20 through the right hand side 23 of prism 19, this focussed image being light spot 15 on the array. For the minimum clearance, light spot 15 is on the extreme right hand side of array 13.

It will be seen that use of prism 19 allows the path of the light, from light source to blade to array, to be "folded" so that only a single lens 17 is used both to transmit light to the blade and to receive light from it.

If the radial position of the tip of blade 5 alters as shown by the broken lines to produce the maximum, instead of the minimum clearance, the path of light from the blade 5 to the array 13 alters as shown by the broken arrowed lines. Because the blade tip is further away from the bottom face 25 of prism 19, the scattered reflected light from the blade is refracted along a different path by the right hand side 23 the prism and the lens 17 brings this light to a focus at the extreme left hand side of array 13.

Photodiode array 13 comprises a linear strip of photodiode elements whose outputs are each scanned in turn by clock-pulse driven circuitry (not shown) so that the position of the light spot on the array is known from the way the output of the circuitry varies with respect to time. It will therefore be seen that the output of the circuitry for array 13 is calibrateable in terms of the magnitude of the clearance between the tip of blade 5 and the inner surface of shroud 3.

Although optical triangulation probes of the above-described layout can be made as compact instruments due to the inclusion of the prism to fold the optical path, they are, in an optical sense, inherently non-centrosymmetric and therefore tolerance variations in the dimensions and focal lengths of its components and in the dimensions and positions of component mountings result in difficulty in obtaining accurate alignment of the components in the finished probe. Such alignment difficulties can be overcome by building a number of adjustments into the system, but this makes such probes expensive to manufacture and the interacting nature of the adjustments makes them particularly time-consuming.

Figure 2A:
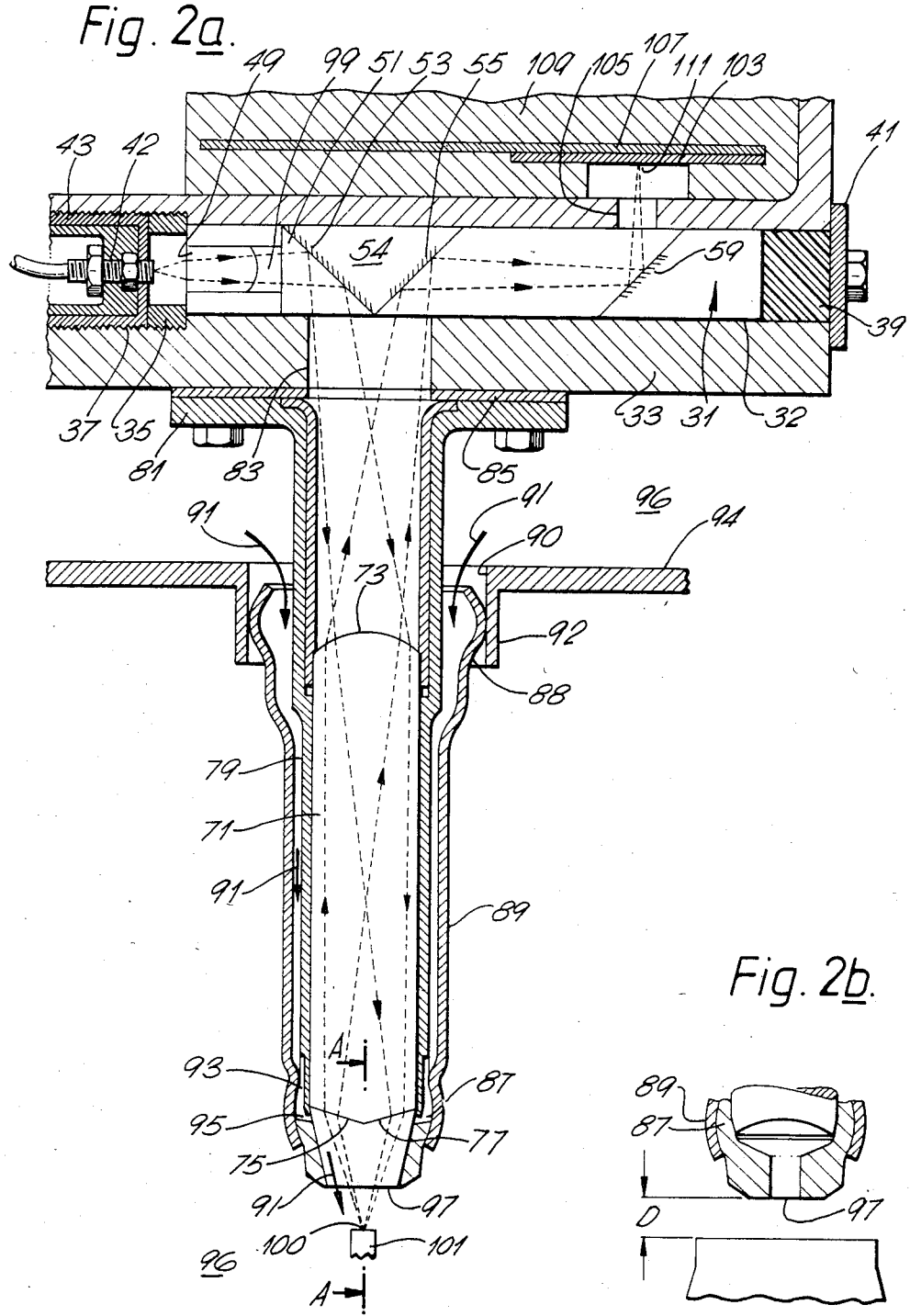
FIG. 2a is a sectional view of the main components of an optical triangulation probe according to the present invention, the section being through the optical path within the probe.
Figure 2B:
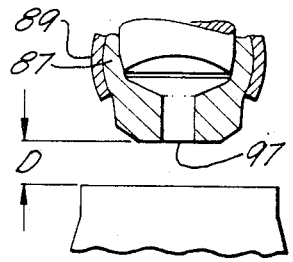

FIG. 2 illustrates the major part of the structure of an optical triangulation probe in which these problems have been largely overcome through the adoption of a new optical arrangement.

The probe of FIG. 2 functions according to the principles already explained in connection with FIG. 1, but its optical components are arranged so that the optical path (shown purely schematically as broken arrowed lines) within the probe is substantially T-shaped rather than Y-shaped as in FIG. 1. This difference in the configuration of the optical path is important because it allows the probe to be manufactured in such a way as to enable accurate pre-alignment of its components during manufacture using standard optical manufacturing techniques known to the average specialist. The number of adjustments required after manufacture is thereby much reduced. The probe is thus cheaper to manufacture and less inconvenient in use.

Describing the probe of FIG. 2 in more detail, the cross-bar of the T-shaped optical path includes an integrated glass assembly 31 containing all necessary mirrors, lenses and apertures. This upper optical assembly 31 is square in cross-section and is a close sliding fit in a correspondingly shaped hole 32 drilled and broached into a suitable metal block which becomes an optical housing component 33. The stem of the T-shape includes a heat-resistant optical saphire rod 71 combining the functions of lens and prism and projecting through the gas passage wall (not shown) of the gas turbine stage in which it is installed. A laser diode 42 defines the left-hand end of the cross-bar of the T-shaped optical path, whilst the right-hand end of the cross-bar is delimited by an internal reflective surface 59 of the glass assembly 31, which deflects light out of the assembly 31 onto the light-sensitive surface of a photodiode array 103 located in an offset position above the cross-bar. The foot of the stem of the T-shape is delimited by the presence of a turbine blade tip 101.

Assembly 31 is held fixed in position within housing 33 by means of a threaded spacer ring 35 screwed into a threaded bore 37 in the left hand side of the housing. Bore 37 is coaxial with the longitudinal axis of symmetry of the assembly 31, but has a diameter somewhat larger than the side of the square end of the assembly. Ring 35 is of sufficient radial thickness to ensure that its right-hand end face bears against the left-hand end face of assembly 31, thus causing a hard rubber block 39 to be slightly compressed by the right-hand end face of the assembly against a metallic cover-plate 41 which is bolted to housing 33 to cover the end of the hole 32 in the housing. This rubber block provides the slight resiliency needed to accommodate differential expansion between housing 33 and assembly 31 due to temperature changes, and to provide for any slight adjustment in the lateral position of the glass assembly.

Returning to the left-hand side of the probe, spacer ring 35 defines the distance between the left-hand end of assembly 31 and the pulsed laser diode 42. This laser diode is held in position within a threaded cylindrical holder 43 which is screwed into contact with the spacer ring 35 within the threaded bore 37.

The upper optical assembly 31 itself will be described in more detail in relation to FIGS. 2 and 3.

Starting from its left-hand end, its first component comprises a block 45 having a cylindrical hole 47 therein in which is secured a plano-convex lens 49, the plane side of the lens 49 being flush with the plane left-hand end face 46 of block 45. The right-hand plane end face 48 of block 45 is secured to the plane left-hand face 50 of a further block 51 whose plane right-hand face 52 makes an acute angle (about 45°) with its other optical face 50. Face 52 of block 51 is secured to the silvered plane face 53 of a triangular block 54 whose other plane optical face 55 is also silvered as required, the included angle between silvered faces 53 and 55 being about a right-angle. In turn, the right hand silvered face 55 of block 54 is secured to the plane left-hand end face 56 of a parallelogram-shaped block 57 whose plane right-hand end face 58 is secured to a part-silvered plane face 59 of block 60 which forms the right-hand end of the assembly 31. The various components of the assembly 31 are secured together by means of an optically clear adhesive as known.

Figure 3B:
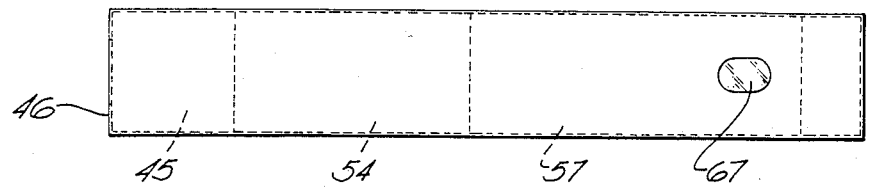
FIG. 3a to 3d show respectively a more detailed sectional side elevation of the upper optical assembly of the probe of FIG. 2, and top, bottom and end elevations of the optical assembly.
Figures 3A, 3D:
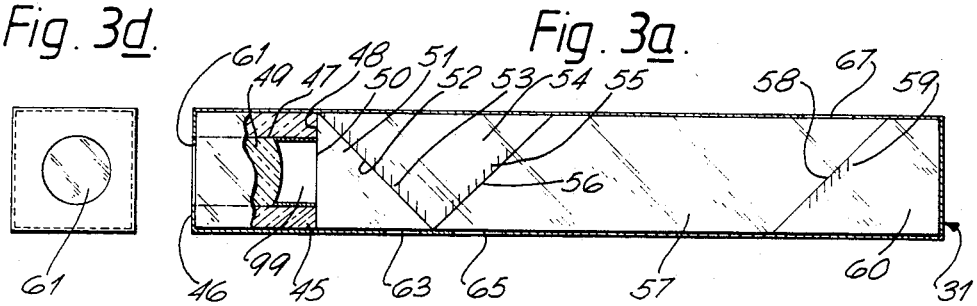
Figure 3C:
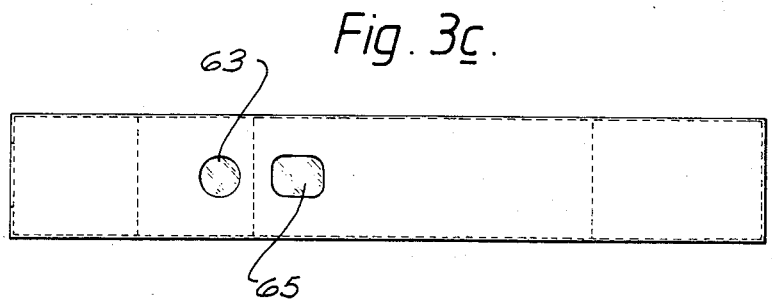

In FIG. 3, the surfaces outlined in a bold line are etched or sand-blasted to a matt finish and painted matt black in order to absorb stray light in the system. However, the surfaces defined with a less bold line are polished an attention is directed to the apertures 61,63,65 and 67 formed in the matt-black exterior surface of assembly 31; light enters and leaves the assembly through these apertures, which also serve to prevent glare reaching the photodiode array.

The stem of the T-shaped optical path includes the optical rod 71 as shown in FIG. 2. This rod 71 combines the functions of the lens 17 and prism 19 in FIG. 1. It has an upper convex lens surface 73 and two lower roof prism facets 75 and 77. The fact that the facets are inverted relative to FIG. 1 enables a longer triangulation baseline to be obtained. The rod is made of sapphire in order to withstand the heat radiated from the turbine passage and conducted through structure from the turbine casing (not shown). This sapphire rod 71 is brazed (or otherwise adhesively fixed) directly into a one-piece cylindrical metal holding tube 79 to act as a pressure seal between the high pressures at the inner end of rod 71 and the lower pressure above the rod 71 within the probe. If a separate lens and prism were to be used each would be held in its own frame which would encroach on the available aperture in the stem of the T-shaped optical path. Use of the sapphire rod 71 enables the available aperture to be maximised because the rod is not held in a frame, but by the brazing or adhesive along its cylindrical side.

Metal holding tube 79 has a flanged upper end 81 so that it can be bolted onto housing 33 in the correct alignment with hole 83 in the housing. A shim plate 85 is provided between housing 33 and the flanged end 81 of holding tube 79 for optical adjustment purposes.

The inner end of holding tube 79 has a toroidal bulge 87 upon whose outer sealing surface is sealingly located the inner end of a sleeve 89 surrounding tube 79 for a major portion of its length. The outer end of sleeve 89 has a toroidal bulge 88 which seals it to the bore 90 of a circular flange 92 of a casing 94 which provides a pressurised, cooled environmental enclosure 96 for the probe. Sleeve 89 defines a cooling air jacket around tube 79 and air 91 passes down the cooling jacket to its inner end and exits from the jacket via cooling air slots 93 and cooling air holes 95 circumferentially spaced around holding tube 79. As the cooling air flows through slots 93 and holes 95, it cools the end of the holding tube 79 and takes away heat which would otherwise be conducted up tube 79. As the cooling air 91 exits from holes 95, it also impinges against the prism facets 75 and 77, thereby cooling the sapphire rod 71. Thereafter, the air 91 is exhausted from the probe into the turbine passage 96 through the slot-shaped nozzle passage 97 in the inner end of the holding tube 79.

Cooling air 91 is of course at a higher pressure than the turbine gases in the turbine passage 96 in order to ensure exhaustion of the air to the turbine passage. The flow of air through nozzle passage 97 ensures that combustion products are not deposited on the prism facets 75 and 77.

During operation of the probe, the pulsed laser diode 42 emits a divergent beam of light as shown. The divergence angle is narrowed by lens 49, and the light then crosses air-gap 99 between the convex face of lens 49 and the left-hand face 50 of block 51. After reflection from the silvered face 53 of triangular block 54 the light exits from assembly 31 via aperture 63 (FIG. 3) and hole 83 in housing 33 and traverses the stem of the T-shape, first encountering convex lens surface 73 of optical rod 71. The beam of light is thereby focussed as a spot 100 onto the tip of blade 101 in turbine passage 96 after an appropriate refraction at the right-hand prism facet 77.

Some light scattered back from the tip of blade 101 then encounters the left-hand prism facet 75 and is focussed by lens surface 73 onto photo-diode array 103 after entry to assembly 31 via hole 83 in housing 33 and optical aperture 65, reflection from silvered plane faces 55 and 59, and exit from assembly 31 via optical aperture 67 and hole 105 in housing 33.

The photodiode array 103 is mounted on a circuit board 107, being one of a stack of such boards (not shown) containing associated amplification, scanning and control circuits as known. The circuit boards are encapsulated in an appropriate compound 109.

In FIG. 2, the distance D between the end of the probe and the blade 101 is at a median value and the focussed reflected light spot 111 on photodiode array 103 is at a central position thereon. An increase in the distance D will cause the spot 111 to be deflected to the right of the array 103, whilst a decrease in D will cause deflection of spot 111 to the left. Hence, the probe functions according to the same principles as the known device of FIG. 1, but the T-shaped optical path allows greater convenience in manufacture and use.

It will be realised that in contrast with the separately dimensioned and positioned features necessary to hold the laser diode and the photodiode array in their distinct positions and orientations in FIG. 1, the single broached hole 32 of FIG. 2, which holds the upper optical assembly 31 in housing 33, can be more tightly toleranced in position, orientation and dimensions and provides a reliable datum for the accurate positioning of the photodiode array 103 in relationship therewith before encapsulation in the compound 109, the laser diode also being accurately locateable in relation to the other components by virtue of its positioning within bore 37, which is an enlarged continuation of the original bore from which broached hole 32 was formed. It should be noted that accurate location of laser diode 41 would not be deleteriously affected if it was positioned (similarly to photodiode array 103) in a holder above housing 33 to project its light beam through a drilling in the housing wall so that the beam entered the cross-bar of the T-shape at right-angles and was reflected along it by an additional mirror surface which could form part of the integrated glass assembly 31, the lens 49 being positioned in the drilling in the housing wall in front of the laser diode.

The possibility also exists that the photodiode array could be located (similary to laser diode 42) at the end of the cross-bar of the T-shaped optical path rather than above the cross-bar as in FIG. 2.

Although the present embodiment utilises an optical assembly 31 comprising several components secured together to form a square-section rod or bar, it should be realised that it would also be possible to separate the block 54 by spacers or otherwise from contact with other optical components included in the cross-bar of the T-shape. This could be advantageous in an embodiment wherein the photodiode array is located at the end of the cross-bar as suggested above, since this arrangement would eliminate the need for block 60.

The T-shaped optical path has another advantage over the former Y-shaped arrangement in that it reduces the overall dimension in the radial direction when the probe is installed in a gas turbine engine. For example, when installed to monitor the high pressure turbine of a large turbofan aeroengine, it enables the probe to be contained under the outer casings of the core engine.

The uniting of the functions of prism and focussing lens in optical rod 71 enables them to be formed accurately in relation to each other and eliminates possible mounting errors which in FIG. 1 can cause variations in their positions relative to each other. It also reduces the magnitude of errors in their positions relative to the other components. The effects of any remaining toleranced variations, including those relating to the focal length of lens 49 and the lens surface 73, can be accommodated by differing thicknesses of shim plate 85.

Regarding the opto-electronic components mentioned above, a suitable photodiode array would be a Reticon RL256, C/17, which can detect movements in light spot 111 of about twenty-six micrometers, thus giving a highly accurate monitor of distance D over the required operating range of, say, 2 mm. Other types of light-spot position detectors besides photodiode arrays are known in the literature, but they are not so conveniently incorporated in a commercially practicable probe.

A suitable laser diode would be an ITT LA 10, which has a ten-watt pulse power. However, continuous wave laser diodes of suitably high power are being developed and use of one such continuous wave diode would avoid the need to synchronise the pulses of the pulsed type with the arrival of the blade tips under the inner end of the probe. Known techniques for accomplishing such synchronisation will occur to those skilled in the art.

It should be noted that the laser diode has a bar-shaped light-emitting area and consequently the light-beam cross-section, the spot of light 100 on blade 101 and the spot of light 111 on diode array 103 are also bar-shaped.

It would be possible to replace the laser diode with a high-intensity light source such as a tungsten/halogen lamp and reflector, though this would make the probe less compact. The light source could alternatively comprise the light-emitting end of a fibre-optic bundle whose distal end would be connected to a light source installed elsewhere, if that were thought to be more convenient.

Although in the above description the optical triangulation probe has been utilised to measure only the change in distance between the probe and the tips of turbine blades, it will be apparent that probes according to the invention could be utilised in other applications where accuracy of measurement over a small range is desired.

I claim:

1. An improved optical triangulation probe for obtaining a measure of the distance between a triangulation baseline and a confronting surface, said probe having an optical path including a light source for producing a light beam outgoing from said probe, light detector means, lens means for focussing said outgoing light beam onto said confronting surface to form a first spot of light thereon, and for focussing light reflected from said confronting surface onto said light detector means to form a second spot of light thereon, said light detector means being adapted to produce an output signal which depends upon the position of said second spot of light thereon, and prism means configured to provide said triangulation baseline firstly by intercepting said outgoing light beam after its passage through said lens means and deflecting said outgoing light beam onto said confronting surface, and secondly by intercepting light reflected from said confronting surface and deflecting said reflected light onto said lens means, whereby said position of said second spot of light on said light detector means is dependent upon the distance between said prism means and said confronting surface;

wherein the improvement comprises the incorporation of a T-shaped optical path portion in said optical path, said T-shaped optical path portion being disposed such that the stem of said T-shape includes said lens means and said prism means, and the cross-bar of said T-shape extends between first and second locations adjacent the light source and the light detector means respectively, said cross-bar including means whereby said outgoing light beam from said light source is directed along said cross-bar and into said stem and said reflected light from said stem is directed along said cross-bar and onto said light detector means.

2. An optical triangulation probe according to claim 1, in which said cross-bar of said T-shaped optical path portion includes a bar-shaped optical assembly comprising a plutality of components secured together, said components having reflective surfaces angled to direct light into and out of said cross-bar as required.

3. An optical triangulation probe according to claim 2, in which said bar-shaped optical assembly is provided with a light-absorptive finish on its exterior surfaces except where light transmission therethrough is required.

4. An optical triangulation probe according to claim 1 in which said light source is located offset from said cross-bar of said T-shaped optical path portion, means being provided to direct light from said light source into said cross-bar.

5. An optical triangulation probe according to claim 1 in which said light detector means is located offset from said cross-bar of said T-shaped optical path portion, means being provided to direct light from said cross-bar onto said light detector means as required.

6. An optical triangulation probe according to claim 1 in which the functions of said lens means and said prism means are combined in a unitary optical component having distal and priximate optical surfaces with respect to said confronting surface, said distal surface comprising said lens means and said proximate surface comprising said prism means.

7. An optical triangulation probe according to claim 5 in which said unitary optical component comprises a cylindrical rod.

8. An optical triangulation probe according to any one of claims 1 to 5 in which said prism means comprises roof prism means.

* * * * *